No. 685,985. Patented Nov. 5, 1901.
J. HERTEL.
MEANS FOR FACILITATING THE PLAYING OF STRING INSTRUMENTS.
(Application filed Feb. 23, 1901.)
(No Model.)
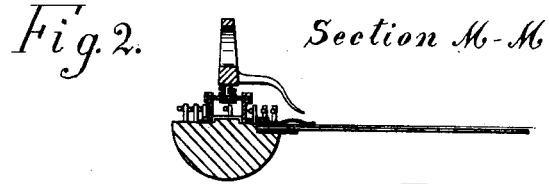
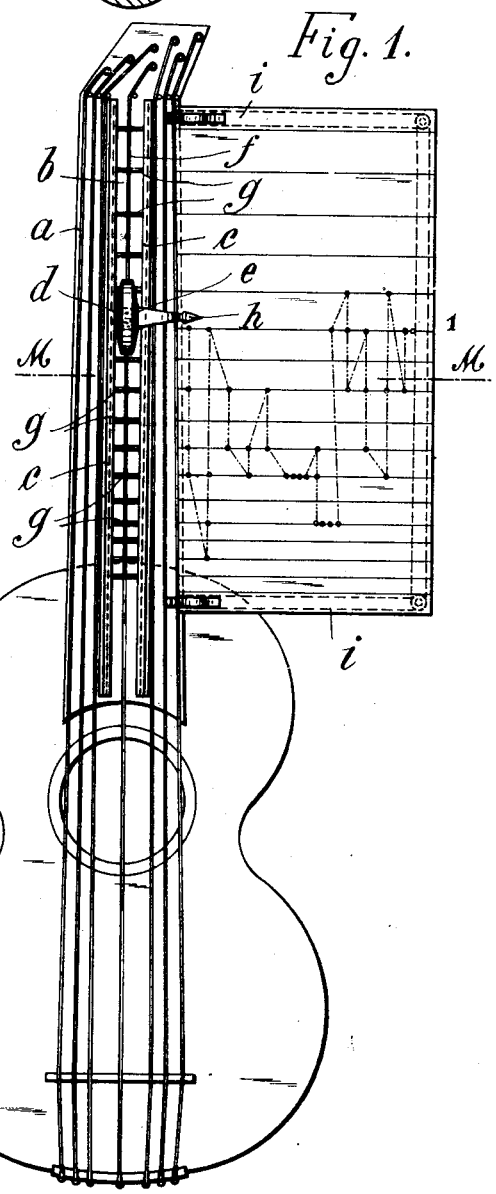
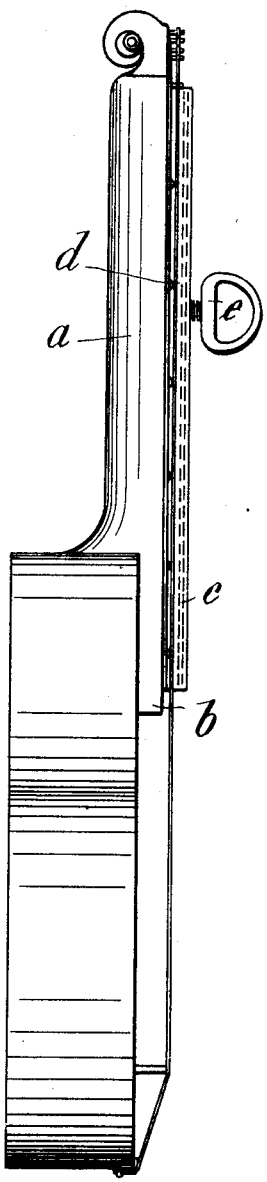
Witnesses:
Inventor:

UNITED STATES PATENT OFFICE.

JULIUS HERTEL, OF BÖSDORF, NEAR LEIPSIC, GERMANY, ASSIGNOR TO EMIL FIEDLER, OF KLINGENTHAL, GERMANY.

MEANS FOR FACILITATING THE PLAYING OF STRING INSTRUMENTS.

SPECIFICATION forming part of Letters Patent No. 685,985, dated November 5, 1901.

Application filed February 23, 1901. Serial No. 48,515. (No model.)

*To all whom it may concern:*

Be it known that I, JULIUS HERTEL, a subject of the King of Saxony, and a resident of Bösdorf, near Leipsic, Saxony, Germany, have invented certain new and useful Improvements in Means for Facilitating the Playing of String Instruments, of which the following is a description.

The present invention consists of improved means for facilitating the playing of string instruments provided with a fretted finger-board, as hereinafter particularly described, and pointed out in the claims.

In order to render the present specification easily intelligible, reference is had to the accompanying drawings, in which similar letters of reference denote similar parts throughout the several views.

Figure 1 is a front elevation, Fig. 2 a cross-section on line M M of Fig. 1, and Fig. 3 a side elevation, of one form of device embodying my invention.

The neck $a$ of the instrument is provided with one melody-string $f$ down the center of the same and a series of accompanying strings arranged at either side of the same. At each side of the melody-string $f$ longitudinally-disposed guide-bars $c\ c$ are provided, on which a slide $e$, capable of movement by the finger or thumb of the player, is arranged. The stem of the slide projects through the slide-plate $d$ and is provided with a small plate at its lower end adapted to depress the melody-string $f$ down onto one or other of the frets $g$ of the finger-board $b$, according to the position of the slide on the said finger-board. The slide is further provided with a pointer $h$, extending laterally over one edge of the neck and adapted to indicate the corresponding line of a note-sheet $i$, attached to the side of the neck in suitable manner. This class of note-sheet is known and contains dots on the lines corresponding to the frets of the finger-board, which dots are connected by a dotted or other line in the order in which they are to be played, as is well known.

The operation of the device will be readily understood, viz: If the slide $e$ is moved by the hand of the player successively to each of the dots on the note-sheet in the order in which they are connected up by the dotted or broken line indicated on the note-sheet of the drawings and the melody-string vibrated each time, obviously the melody written on the note-sheet will be produced. The accompaniment-strings may be played somewhat after the manner of the zither. Each time the note has to be played the thumb or finger ring of the slide $e$ must be depressed, so as to adjust the melody-string to the note in question.

I claim as my invention—

1. The combination with a string instrument having a melody-producing string and a fretted finger-board of a slide-plate $d$ having spring-pressed finger-ring $e$ and means in connection with the latter for pressing the said melody-string down onto a fret of the finger-board and guides at either side of the melody-string for the said slide in the manner and for the purpose substantially as described.

2. The combination with a string instrument having a melody-producing string and a fretted finger-board, of a slide-plate $d$ having spring-pressed finger-ring $e$ and means in connection with the latter for pressing the said melody-string down onto the fret of the finger-board, guides at either side of the melody-string for the said slide, a pointer on the said ring and a melody-indicating note-sheet fixed to the side of the neck of the instrument over which said pointer moves in the manner and for the purpose substantially as described.

In witness whereof I have hereunto set my hand in presence of two witnesses.

JULIUS HERTEL.

Witnesses:
MORITZ SPREER,
CHAS. J. BURT.